United States Patent Office 3,214,571
Patented Oct. 26, 1965

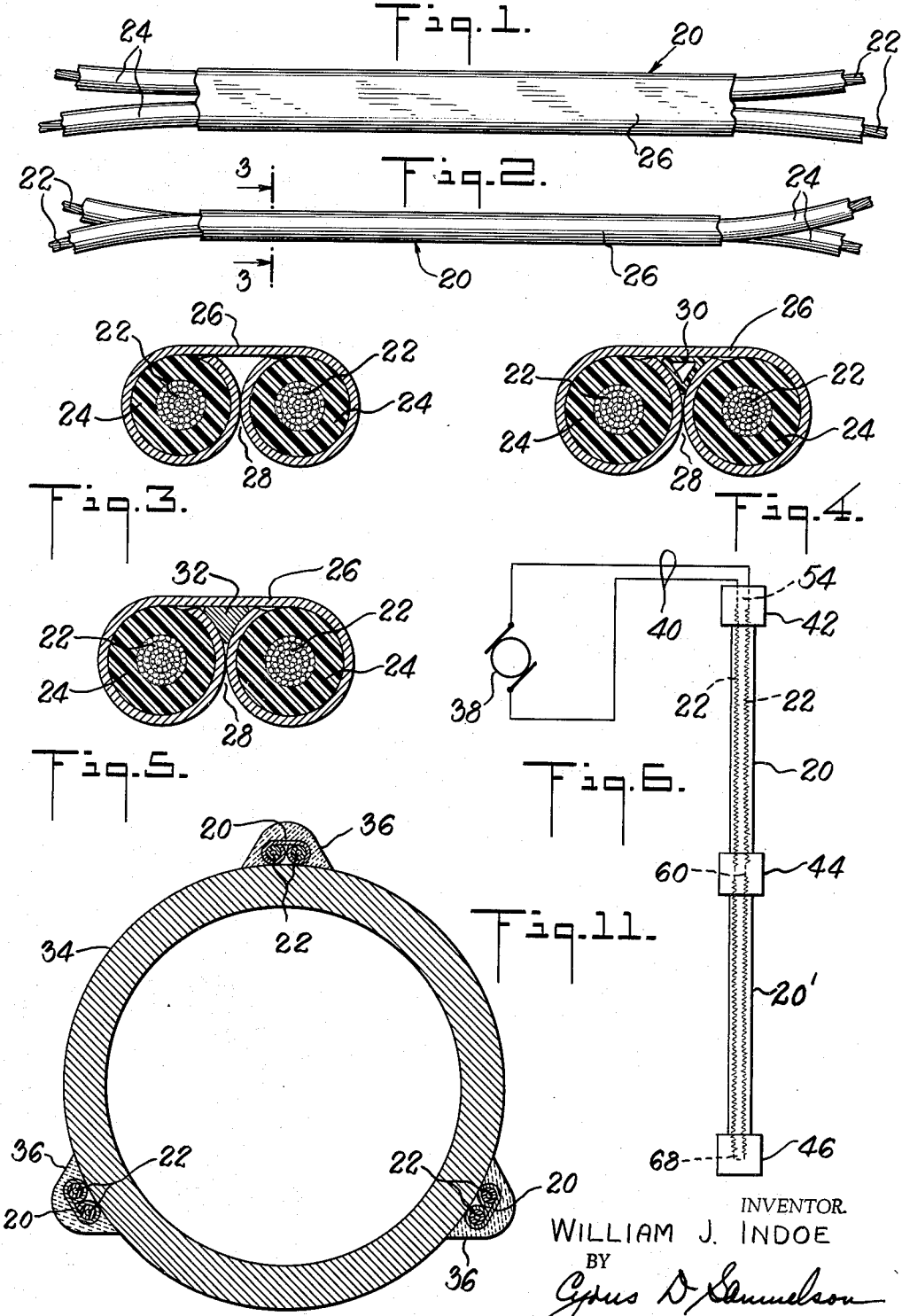

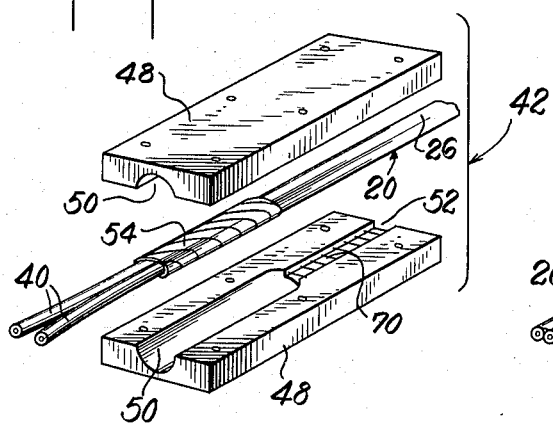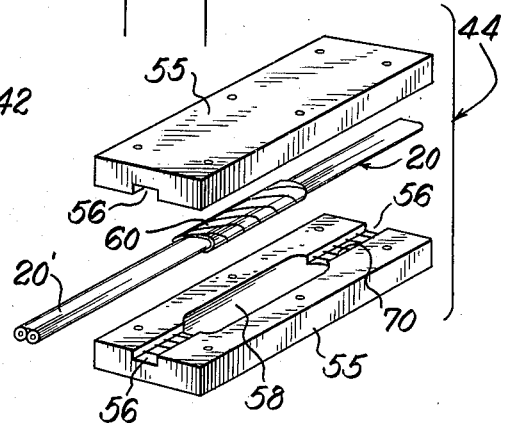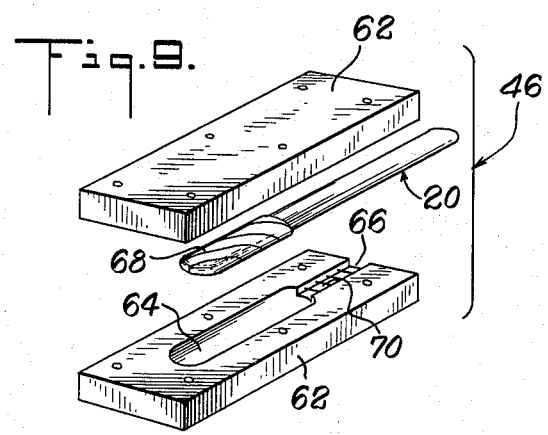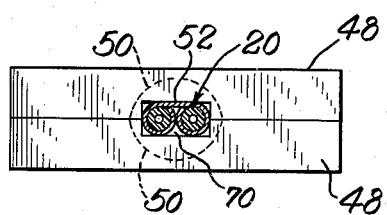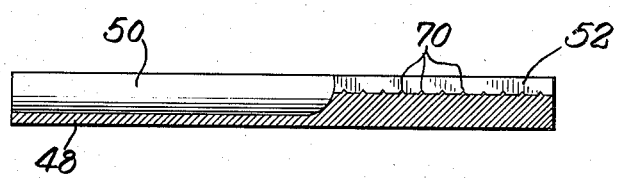

3,214,571
HEATING CABLE AND CONNECTORS THEREFOR
William J. Indoe, 45 Oak St., Allendale, N.J.
Filed May 27, 1963, Ser. No. 283,338
8 Claims. (Cl. 219—544)

The invention relates to heating cables and in particular to those heating cables which may be placed on the outside of a pipe or container and used to raise the temperature of the contents of the pipe or container above the ambient temperature of the surrounding environment.

Up to now, mineral insulated (MI) cable, steam jackets and steam tracers have been used to keep the contents of pipe lines from freezing in cold weather. All of these prior art structures are either expensive, difficult to install or both. For a long time a need for an easily-installed, heating system for exposed pipe lines and similar containers has been evident to those active in the art. Mineral insulation cable shorts very easily because the wires are bare and uninsulated from each other when the outside sheath is removed. The present invention fills that need and has for an important object the providing of an electrical heating cable which is economical to produce and easy to install.

It is a further object of the invention to provide such a heating cable which may be installed on the outside of the container whose contents are to be heated.

It is a still further object of the invention to provide such a heating cable wherein the wires are enclosed in Teflon insulation and the combination is contained in an outer metallic sheath.

It is a still further object of the invention to provide such a heating cable wherein a beading of Teflon or metal is employed to render the interior of the encased cable substantially moisture-free.

It is a still further object of the invention to provide a family of connectors to be used in conjunction with the cables of the invention.

It is a still further object of the invention to provide a heating cable whose individual conductors are insulated after the outer sheath is removed in order to avoid accidental shorting of the system.

These and other objects, advantages, features and uses will be apparent during the course of the following discussion, when taken in conjunction with the accompanying drawings, wherein:

FIGURE 1 is a horizontal plan view of a cable of the invention;

FIGURE 2 is a side elevational view of the cable of FIGURE 1;

FIGURE 3 is an enlarged cross-sectional view taken along the lines 3—3 of FIGURE 2, viewed in the direction of the arrows;

FIGURE 4 is a view similar to that of FIGURE 3 of a further embodiment of the cable of the invention;

FIGURE 5 is a view similar to that of FIGURE 3 of a still further embodiment of the cable of the invention;

FIGURE 6 is a schematic, circuit diagram of an installation using the cable and connectors of the invention;

FIGURE 7 is an expanded perspective view of a connector of the invention used to connect the cable to the input leads;

FIGURE 8 is a view similar to that of FIGURE 7 of a connector of the invention used to connect two runs of cable together;

FIGURE 9 is a view similar to that of FIGURE 7 of a connector of the invention used to close the electrical circuit at the end of the run;

FIGURE 10 is a typical cross-section of a closed connector with the cable contained therein;

FIGURE 11 is a cross-sectional view of a pipe on which three cables of the invention have been installed; and FIGURE 12 is a longitudinal, sectional view of the lower plate of the cold lead connector used with cables of the invention.

Heating cables of the invention may be used for the following purposes:
(1) Prevention of steam line freezing.
(2) Installation in chemical plants where presently used heating units would corrode or decompose when exposed to certain chemicals.
(3) Reducing the viscosity of asphalts, bunker C and similar products in refineries.
(4) As a tracing on water pipes for maintenance of constant flow in cold regions where flexibility is required.
(5) As a stand-by unit in conjunction with a concentric steam pipe system such as those employed by sulphur pumping stations.
(6) As a general heater for sidewalks, driveways and swimming pools.

The heating cables of the invention may also be used for many other purposes where flexibility and economy of installation and operation are factors.

In the drawings, wherein, for the purpose of illustration, are shown various embodiments of the cable and connectors of the invention, the numeral 20 designates the cable of the invention, generally. Cable 20 is seen to comprise (FIGURES 1 and 2) a sheath 26 and a pair of electrical heating wires 22 encased in insulation 24. Sheath 26 is formed of a mechanically workable metal having a hardness equal to or greater than that of copper. Insulation 24 is preferably formed of Teflon polytetrafluoroethylene which has good electrical insulation characteristics and will withstand temperatures of the order of 500° F. without breakdown. Wires 22 may be made of any material which dissipates heat with flow of electrical current.

The cables are formed as shown in FIGURE 3 so that sheath 26 has one substantially flat surface running the length of the cable and the longitudinal edges are crimped around the insulated wires as at 28. The sheath is crimped so as to reduce the voids within the cable but some room must be left to permit the insulation to expand during use. This is necessary because the polytetrafluoroethylene insulation has a high temperature coefficient of volume expansion. If some room were not left, the expansion would rupture the sheath or otherwise damage the cable. However, most of the voids must be eliminated in order to prevent the entry of water or moisture into the cable.

In FIGURE 4, the cable is seen to be provided with a hollow, tubular Teflon beading running the length of the cable. This beading serves to reduce the voids in the cable but there is still sufficient room because of the tubular structure of the beading to permit the expansion of the Teflon insulation and beading without damaging the cable. Before the sheath 26 is crimped around wires 22 and beading 30 of FIGURE 4, the beading is generally cylindrical in shape. After crimping, the beading tends to follow the contours of the sheath as shown in the figure. If desired, the beading may be formed of a solid tube of Teflon. The cable of FIGURE 5 is somewhat similar to that of FIGURE 4 except that the beading is a solid rod formed of a mechanically workable metal having a hardness equal to or greater than that of copper.

FIGURE 6 is a schematic wiring diagram showing the electrical circuit used to connect each cable of the invention to the source of voltage 38. Electrical leads 40 are generally referred to as the "cold" leads since they are larger in cross-section than the heating wires and consequently dissipate less heat. The cold leads are usually contained in a metal tube for convenience in handling and are used to connect wires 22 to the source of voltage 38. Cold-lead connector 42 is used to make connection 54 between cold leads 40 and heating wires 22 (the detailed structure of this connector and of connectors 44 and 46 will be discussed later in the specification).

When more than one length of cable is required to cover the area to be protected, the cables 20 and 20' are spliced at 60 by means of splice connector 44. The electrical circuit is closed by splicing the two heating wires together in end connector 46 as shown at 68.

Cold lead connector 42 (FIGURE 7) is seen to comprise a pair of hollow mating plates 48 having a pair of matched recesses. Recesses 50 are provided to receive the splice between the cold leads 40 and the electrical heating wires 22 and recesses 52 are provided to receive the sheathed portion of the cable. The splices between the cold leads 40 and the cable leads are made as follows:

(1) Remove a portion of the sheath from the cable and a portion of the metal tube from the cold leads.

(2) Remove the insulation from the electrical heating wires and the cold leads.

(3) Slide a metal sleeve over a lead 40 and a heating wire 22.

(4) Crimp the sleeve in a manner well-known in the art at each end to securely join a heating wire and a cold lead.

(5) Wrap the joints with Teflon tape.

(6) Wrap the two insulated joints together with Teflon tape to form insulated joint 54.

It can thus be seen that the unsheated portion of the cable requires a larger recess within the connector than the sheated portion. To prevent the cable from pulling out of the connector, recesses 52 are roughened in the shape of a sawtooth as shown at 70 (FIGURE 12). The mating plates 48 are joined together by means of screws and nuts or any other suitable means after the cable has been set in place in the recesses.

The connector 44 of FIGURE 8 comprises a pair of mating plates 55, recesses 56 to receive the sheathed portions of cable 20 and 20' (similar in construction to cable 20) and recess 58 which receives the splice joint 60. Spliced joint 60 is formed by joining the heating wires of cable 20 to those of cable 20' in the same manner as described heretofore for connecting the cold leads to the cable wires. The heating wire joints are separately wrapped with Teflon tape and are then wrapped together with Teflon tape. The joined cables are laid in the recesses of the connector and the plates are suitably fastened together. The recesses 56 are also roughened in the shape of the sawtooth as shown at 70.

The connector 46 of FIGURE 9 comprises a pair of mating plates 62 and recesses 64 and 66. Joint 68 is formed by connecting the two heating wires of cable 20 together in the same manner as described heretofore for connecting the cold leads to the cable wires and wrapping the junction with Teflon tape. The end of the cable is laid in the recesses and the plates are suitably fastened together. Recess 66 is also roughened in the shape of a sawtooth as shown at 70.

In FIGURE 11 there is shown a cross-section of a typical installation using cables of the invention. Each cable 29 is affixed to the pipe 34 by means of a heat transfer cement and is then covered by a layer of the heat transfer cement such as Thermon 63 which is manufactured by Thermon Incorporated of Houston, Texas.

By way of illustration, but not by way of limitation, following is an example of an installation of FIGURES 11 and 12:

Pipe 34: 2" diameter; 22' long; contents: water; insulated with 3" round corrugated asbestos fibre
Cables 20: Heating wires #21 Nichrome 20' long
Insulation 36: ¾" by 21' of Thermon 63
Voltage source: 110 volts A.C.
Resistance per cable: 16.67 ohms
Effective resistance of cables: 5.55 ohms
Current: 10 amperes
Power: 550 watts
Voltage drop across cables: 5.55 volts
Ambient temperature: 74° F. (still air)
Time required to raise water to 120° F.: 60 minutes While the invention has been disclosed in relation to specific examples and embodiments, I do not wish to be limited thereto, for obvious modifications, changes, alterations and adjustments will occur to those skilled in the art without departing from the spirit and scope of the invention.

Having thus described the invention, I claim:

1. A heating system for application to the exterior of a container the temperature of whose contents must be raised above that of the ambient temperature of the surrounding environment comprising:
   an electrical heating cable comprising:
      a pair of electrical heating wires;
      an insulated covering of polytetrafluoroethylene around each of the pair of electrical heating wires;
      a metallic sheath surrounding the pair of insulated electrical heating wires;
      the metallic sheath being crimped over the insulated electrical heating wires along the length thereof such that there are a minimum of voids in the interior of the cable;
   a source of electrical voltage;
   a pair of electrical leads;
   one end of the pair of electrical leads connected to the source of electrical voltage;
   a connector for connecting the other end of the pair of electrical leads to the electrical heating cable, the connector comprising:
      a pair of hollowed mating plates having recesses of different dimensions;
      one of the recesses within the mating plates being shaped to receive the sheathed cable;
      the other of the recesses within the mating plates being shaped to receive the unsheathed bare electrical heating wires each of which are joined to one of the pair of electrical leads within the other of the recesses and wrapped such that the two connections so made are insulated from each other;
      means for holding the mating plates together.

2. A heating system as described in claim 1 including a second connector for connecting together the ends of the electrical heating cable opposite the ends connected to the pair of electrical leads, the second connector comprising:
   a pair of hollowed mating plates having recesses of different dimensions;
   one of the recesses within the mating plates being shaped to receive the sheathed cable;
   the other of the recesses within the mating plates being shaped to receive the unsheathed bare electrical heating wires which are joined together to form a joint;
   a layer of insulation wound around the joint;
   means for holding the mating plates together.

3. A heating system as described in claim 1 including a second electrical heating cable and a second connector for connecting the electrical heating cables in series, the second connector comprising:
   a pair of hollowed mating plates having three recesses therein;
   the first of the recesses being shaped to receive the first sheathed cable;
   the second of the recesses being shaped to receive the second sheathed cable;
   the third of the recesses being shaped to receive the unsheathed bare electrical heating wires which are connected so that one from each heating cable is connected to one from the other heating cable;
   the connections between the electrical heating wires being wrapped such that the two connections are insulated from each other;
means for holding the mating plates together.

4. A heating system as described in claim 3 including a third connector for connecting together the ends of the second electrical heating cable opposite those connected to the first electrical heating cable, the third connector comprising:
a pair of hollowed mating plates having recesses of different dimensions;
one of the recesses within the mating plates being shaped to receive the sheathed cable;
the other of the recesses within the mating plates being shaped to receive the unsheathed bare electrical heating wires which are joined together to form a joint;
a layer of insulation wound around the joint;
means for holding the mating plates together.

5. In a heating system for application to the exterior of a container the temperature of whose contents must be raised above the ambient temperature of the surrounding environment which system includes a source of voltage, at least one sheathed electrical heating cable having two ends and comprising a pair of insulated electrical heating wires and a heat-conductive metallic sheath surrounding the electrical heating wires, a pair of electrical leads connecting the pair of electric heating wires at one end of the sheathed electrical heating cable to the source of voltage and the pair of electrical heating wires at the other end of the sheathed electrical heating cable being electrically connected to each other in a connection, electrical insulation covering the electrical heating wires within the connection, and a connector for receiving the connection and cooperating with the heat-conductive metallic sheath, said connector comprising:
a pair of heat-conductive, metallic, hollowed mating plates, each having contiguous first and second recesses;
the first recess being shaped so as to receive the sheathed electrical heating cable with the mating plates contiguous with and in contact with the heat-conductive metallic sheath and connecting the second recess and one edge of the connector;
the second recess being shaped so as to receive the pair of electrical heating wires covered by the electrical insulation; and
means for holding the mating plates together.

6. The invention for claim 5 wherein the surface of the first recess is provided with a series of sawteeth whereby the sheathed electrical heating cable is gripped more securely in the connector.

7. In a heating system for application to the exterior of a container the temperature of whose contents must be raised above the ambient temperature of the surrounding environment which system includes a source of voltage, at least two sheathed electrical heating cables, each of which has two ends and comprises a pair of insulated electrical heating wires and a heat-conductive metallic sheath surrounding the electrical heating wires, a pair of electrical leads connecting one of the pair of electrical heating wires at one end of one of the sheathed electrical heating cables to the source of voltage, the other end of the said pair of electrical heating wires being electrically connected to one end of the pair of electrical heating wires of the second sheathed electrical heating cable in a connection, electrical insulation covering the electrical heating wires within the connection, and a connector for receiving the connection and cooperating with the heat-conductive metallic sheath, said connector comprising:
a pair of heat-conductive, metallic, hollowed mating plates, each having first, second and third recesses;
the first recess being shaped so as to receive one of the sheathed electrical heating cables with the mating plates contiguous with and in contact with the heat-conductive metallic sheath and connecting the second recess and an edge of the connector;
the second recess being shaped so as to receive the electrical connection between the two pairs of electrically connected electrical heating wires;
the third recess being shaped so as to receive the second of the sheathed electrical heating cables with the mating plates contiguous with and in contact with the heat-conductive metallic sheath and connecting the second recess and an edge of the connector; and
means for holding the mating plates together so that the connector serves to carry through a connection between the heat-conductive metallic sheaths of the two sheathed electrical heating cables.

8. The invention of claim 7 wherein the surface of at least one of the recesses receiving a sheathed electrical heating cable is provided with a series of sawteeth whereby the sheathed electrical heating cable is gripped more securely in the connector.

References Cited by the Examiner

UNITED STATES PATENTS

| | | | |
|---|---|---|---|
| 926,148 | 6/09 | Sullivan | 174—72 |
| 1,421,168 | 6/22 | Charm | 174—117.1 |
| 1,840,536 | 1/32 | Shore | 174—95 X |
| 2,174,377 | 9/39 | Bowden et al. | 174—88 X |
| 2,188,178 | 1/40 | Eby | 174—88 |
| 2,397,568 | 4/46 | Seaman. | |
| 2,459,653 | 1/49 | Keyes. | |
| 2,475,184 | 7/49 | Hudson | 174—92 |
| 2,528,966 | 11/50 | Moore et al. | 219—544 X |
| 2,544,233 | 3/51 | Kennedy | 174—117 X |
| 2,585,443 | 2/52 | Cox | 338—274 X |
| 2,701,819 | 2/55 | Hirtle | 174—117.6 |
| 2,710,909 | 6/55 | Logan et al. | 338—214 X |
| 2,808,492 | 10/57 | Yohe | 338—251 X |
| 2,822,460 | 2/58 | Goldstaub | 219—544 X |
| 2,867,680 | 1/59 | Strecher | 147—92 |
| 2,934,592 | 4/60 | Eisenhauer | 174—92 |
| 2,962,542 | 11/60 | Witt | 174—76 |

FOREIGN PATENTS 444,640  3/36  Great Britain.

RICHARD M. WOOD, *Primary Examiner.*
JOHN P. WILDMAN, *Examiner.*